United States Patent [19]

Griesshaber et al.

[11] Patent Number: 4,507,683
[45] Date of Patent: Mar. 26, 1985

[54] CAMERA STATUS AND DIAGNOSTICS DISPLAY SYSTEM

[75] Inventors: Karl H. Griesshaber; Charles A. Bialo, both of San Jose, Calif.

[73] Assignee: Ampex Corporation, Redwood City, Calif.

[21] Appl. No.: 364,739

[22] Filed: Apr. 2, 1982

[51] Int. Cl.³ .......................... H04N 7/02; H04N 5/22
[52] U.S. Cl. ........................................ 358/185; 358/10; 358/108; 358/181; 358/183; 340/524
[58] Field of Search ............... 358/181, 185, 183, 139, 358/10, 108; 340/524, 525

[56] References Cited

U.S. PATENT DOCUMENTS

| | | | |
|---|---|---|---|
| 3,502,804 | 3/1970 | Barr | 358/185 |
| 3,891,792 | 6/1975 | Kimura | 358/183 |
| 3,898,644 | 8/1975 | Baxter | 358/108 |
| 4,120,004 | 10/1978 | Coutta | 358/108 |
| 4,245,252 | 1/1981 | Nagumo | 358/183 |
| 4,326,219 | 4/1982 | Griesshaber | 358/163 |

Primary Examiner—Tommy P. Chin
Attorney, Agent, or Firm—George B. Almeida; Joel D. Talcott

[57] ABSTRACT

An operator is provided with a continuous display, on a single convenient monitor, of the extent of progress, the status, etc., of each camera in a multi-camera system, during a microprocessor controlled automatic setup procedure. The display is superimposed on a video picture generated by the selected camera, which corresponds to one of various video signals selectable by the operator.

24 Claims, 10 Drawing Figures

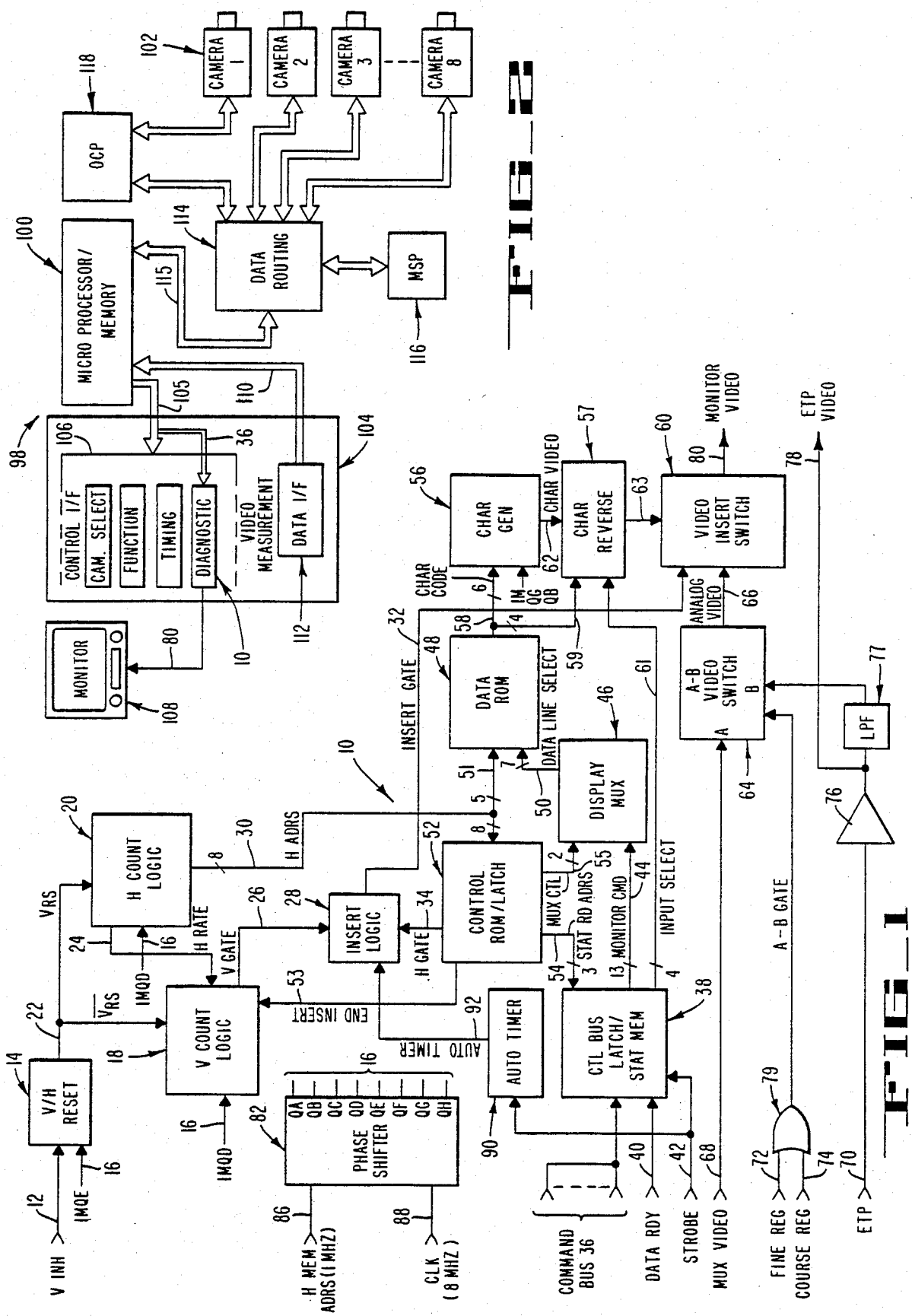

FIG_3
FIG_4

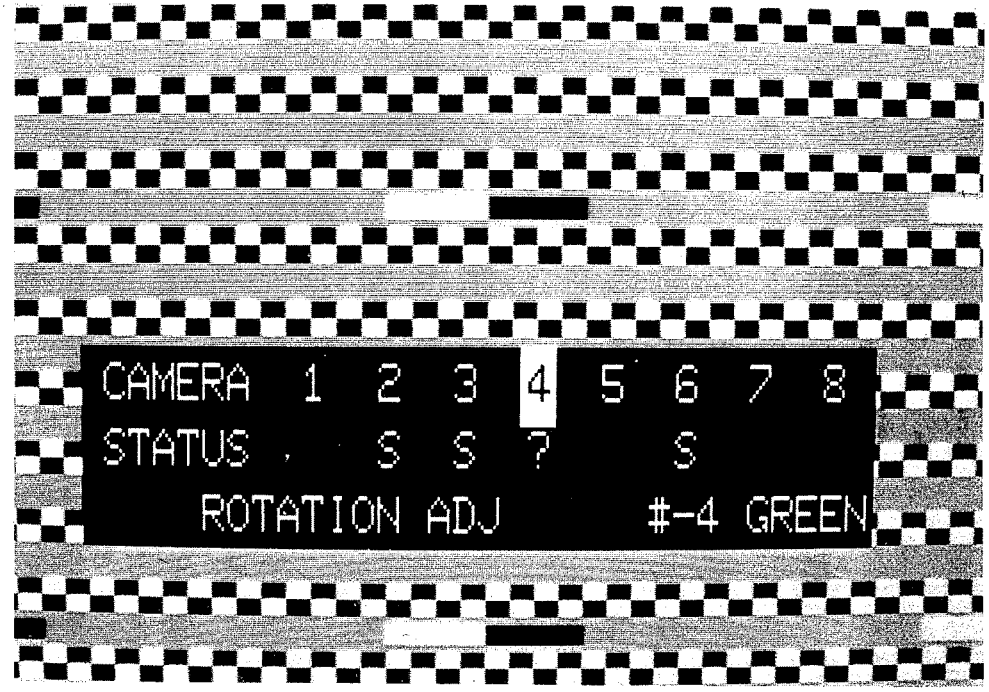
FIG_5
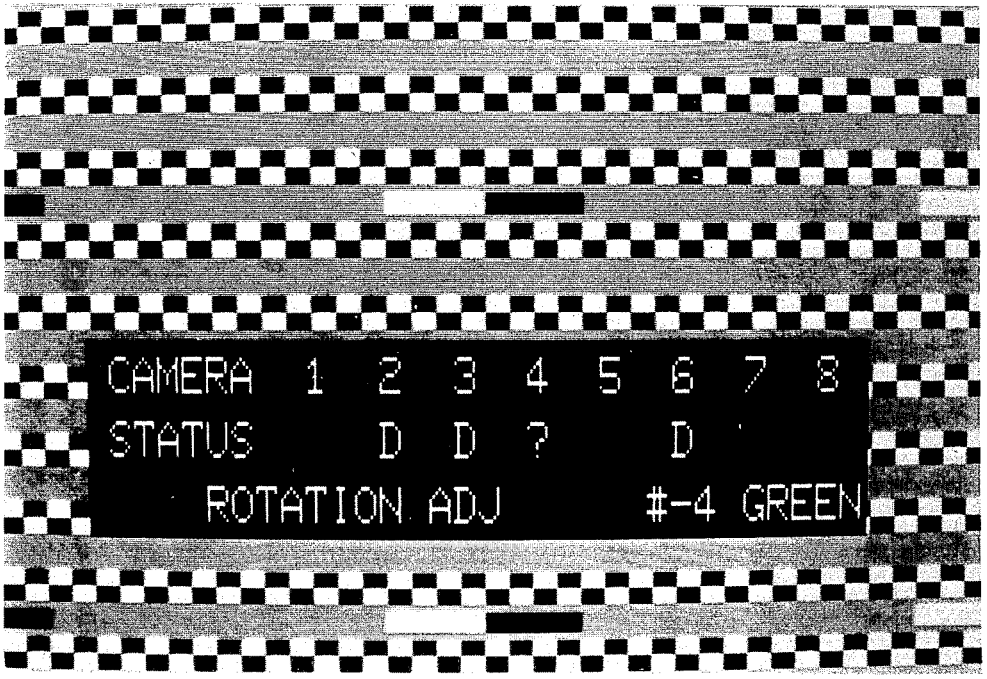
FIG_6

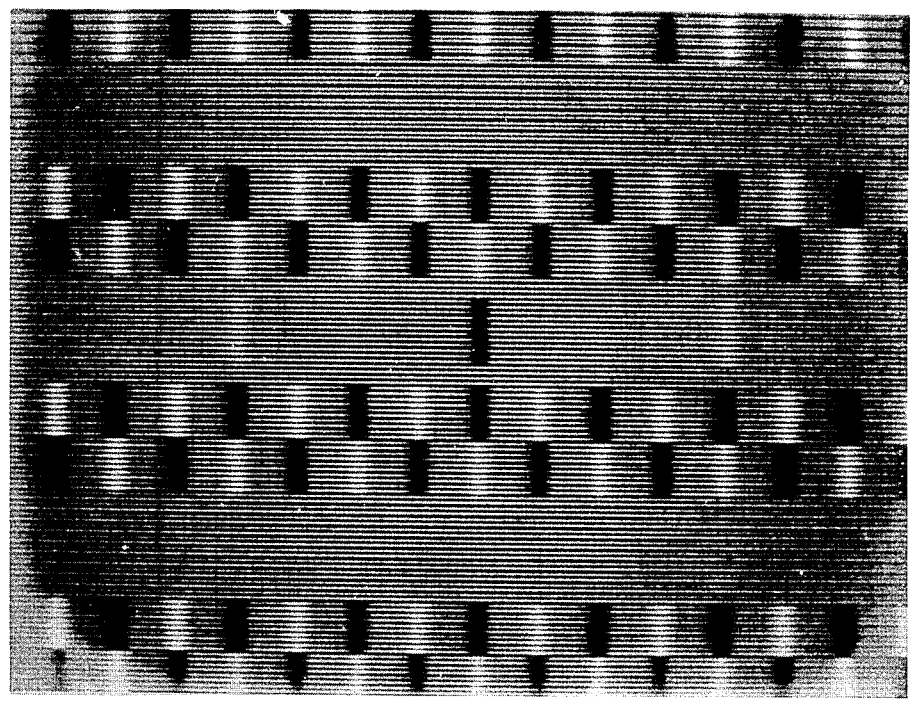
FIG_7

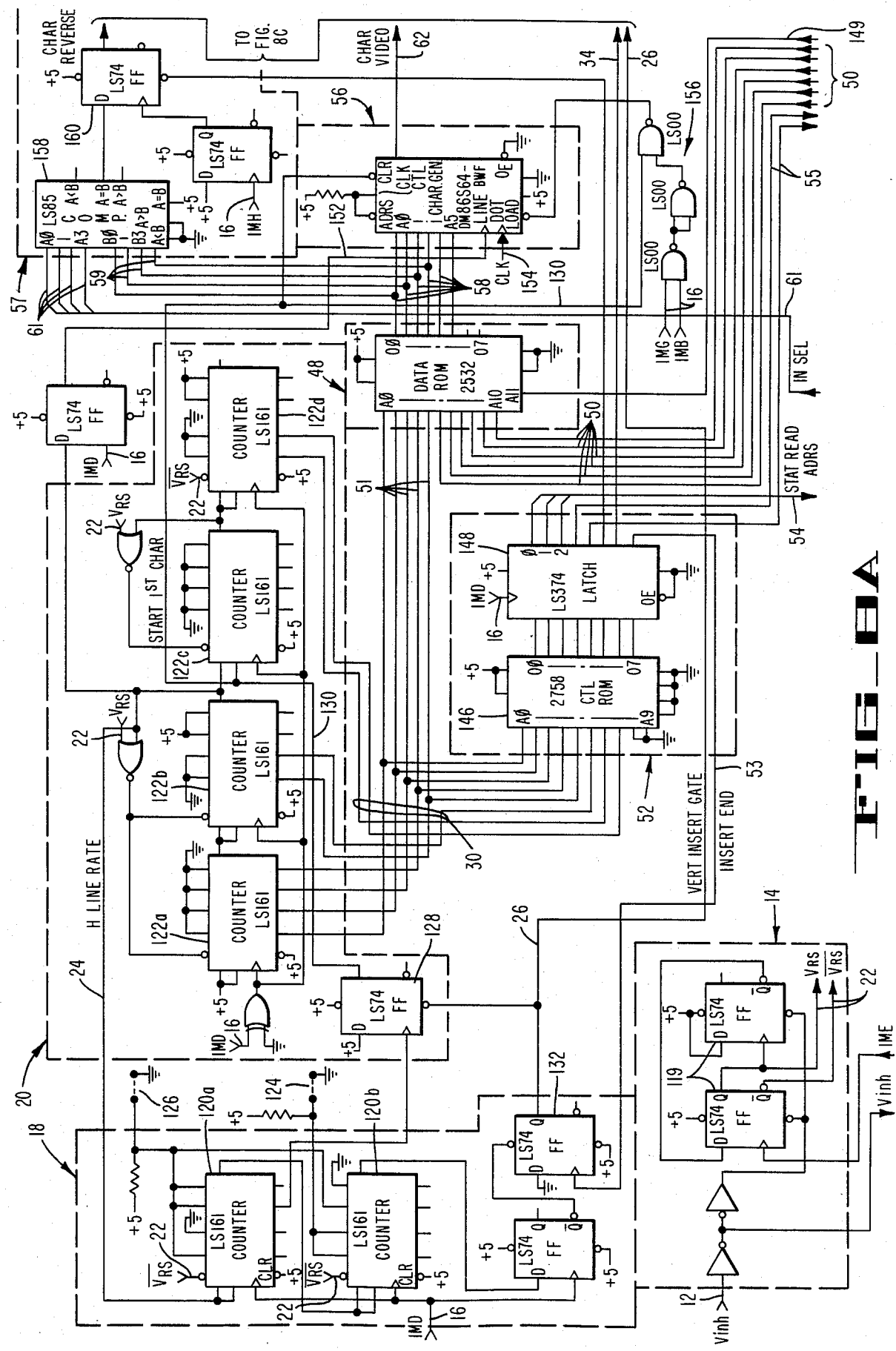

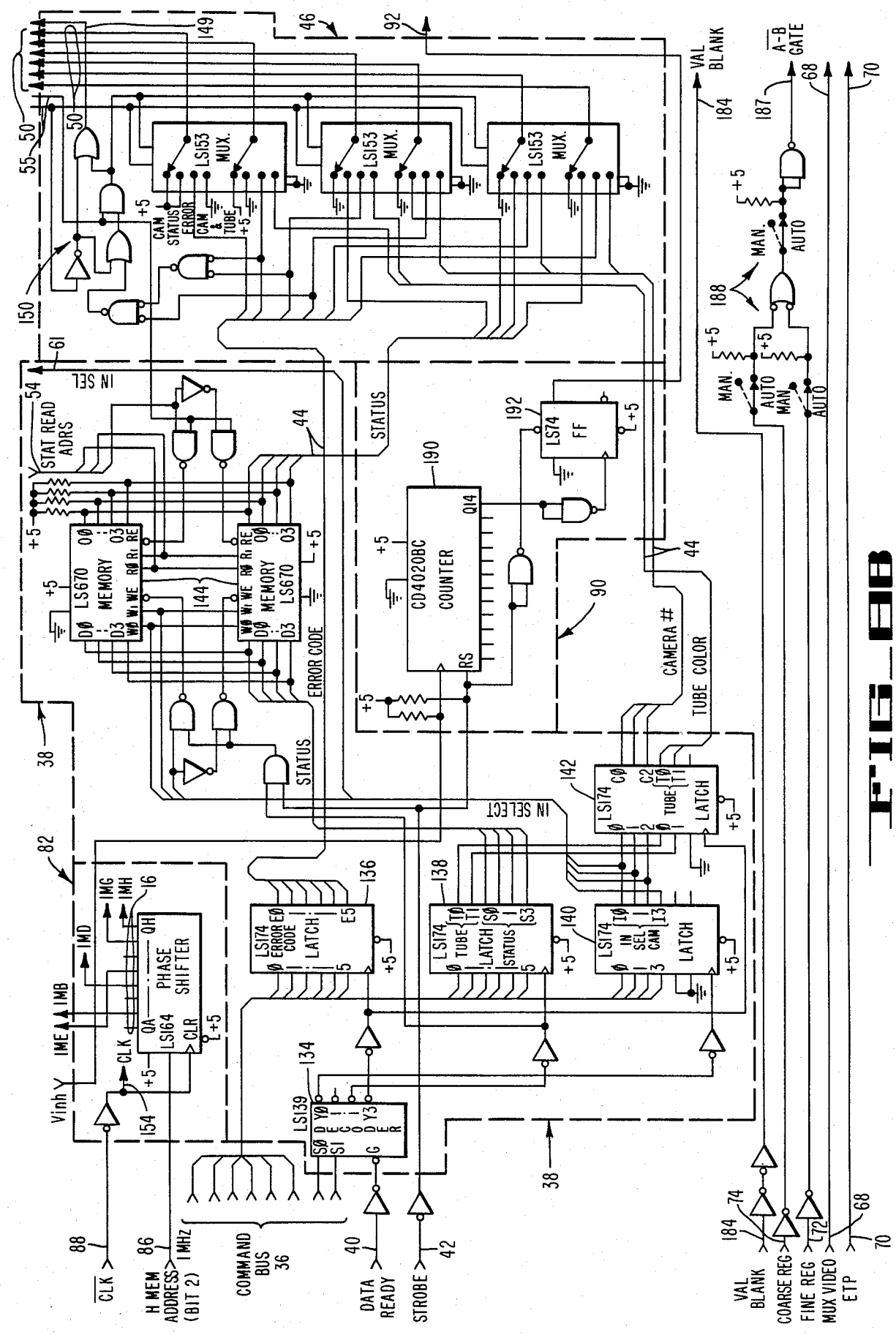

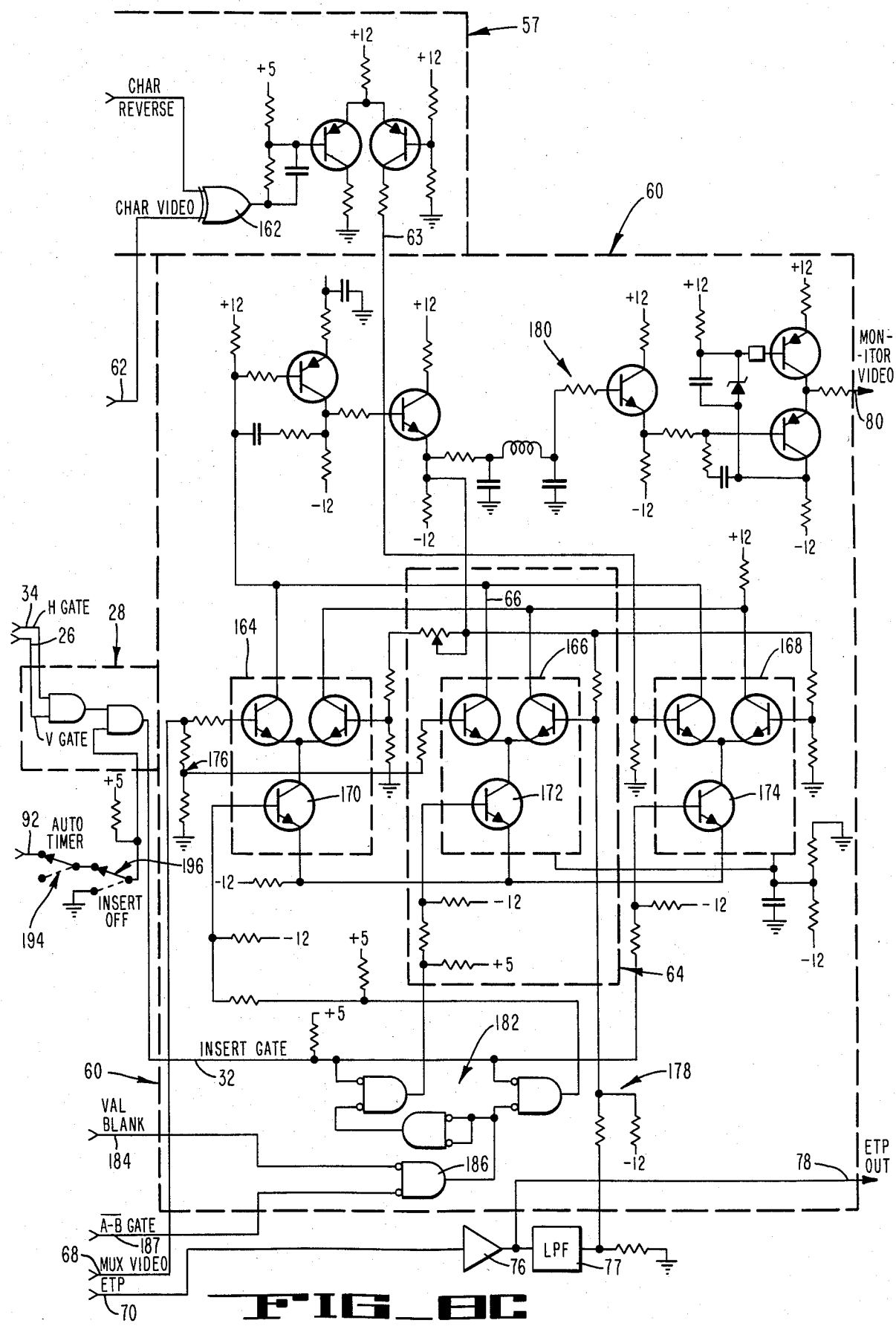

CAMERA STATUS AND DIAGNOSTICS DISPLAY SYSTEM

CROSS REFERENCE TO RELATED APPLICATIONS

Digital Error Measuring Circuit For Shading And Registration Errors In Television Cameras, Ser. No. 139,604, filed April 11, 1980, to Karl H. Griesshaber, now issued as U.S. Pat. No. 4,326,219.

BACKGROUND AND SUMMARY OF THE INVENTION

The present invention relates to automatic setup systems for television cameras and particularly to an apparatus and method for continuously monitoring the status and diagnostic condition of a camera, along with the camera video signal, during the automatic setup of multiple cameras.

In the very recent past, television cameras such as broadcast quality studio cameras, and electronic field production (EFP) cameras, have become more and more sophisticated. Such increasing sophistication has included the use of digital techniques throughout their design; i.e., the camera systems employ microprocessor control with associated memories and various degrees of digital logic. Such digital techniques also facilitate the use of automation whereby various highly sophisticated and totally automated digital error measurement and error correction systems are employed to correct scan raster spatial errors, black and white shading errors, focus adjustments, gamma adjustments, etc.

By way of example, such digital techniques may include an automatic setup unit (ASU) which automatically generates error measurement signals during the setup mode of the camera, and then supplies the signals in digital form to a digital spatial error corrector (SEC) circuit located in the camera head. In the ASU, the spatial, shading, etc., errors are measured by providing a comparison between a geometrically perfect electronic test pattern (ETP) signal and the camera signal generated by scanning an optical test pattern. The optical test pattern contains a given pattern of horizontal and vertical black and white lines, i.e., small black and white checkers, corresponding to the electronic test pattern horizontal and vertical frequencies. During an automatic setup mode, the signal from each tube of a plurality of cameras is compared to the electronically generated test pattern via an ASU microprocessor to derive the spatial and shading errors for each tube in the succession of cameras.

Thus, in such microprocessor controlled multiple camera setup systems, camera and tube identification, the camera status information derived during the automatic setup procedure and the extent of the progress of each camera during the setup procedure is contained in the memory of the ASU microprocessor.

It follows that it would be extremely useful and would further the efficiency in setting up multiple cameras, if the status of the camera setup process for each camera could be monitored and displayed in some manner convenient to an operator. Thus, for example, it would be useful if the operator could visually monitor a display which included information such as the number of the camera being processed, the extent to which the setup process has progressed for that camera, the successful completion of the setup process of each camera, any errors that may exist during the setup, the identification and location of the error, etc.

Accordingly, the invention combination provides a heretofore unavailable system which continuously monitors and displays the status and diagnostic condition of a camera in a plurality of cameras during an automatic setup procedure, wherein the status information from each camera is displayed via a single video monitor convenient to the operator. In addition, the display is inserted in one of several video signals of the camera that is selected and is being processed by the ASU. Thus, the system further provides means to display the absolute displacement errors in any chroma channel of any camera being processed.

To these ends, circuit means is provided to generate an insert time window corresponding to the size of the display and to its desired location in the video picture. A command bus from a camera system microprocessor provides command bytes to a control bus latch and memory circuit which selectively latches data from the microprocessor regarding camera identification, status, errors, etc. The latched data are subsequently read out in response to read enable signals from a control read-only memory (ROM). The latched command data is selectively multiplexed to character generator means in response to the control ROM. The character generator means provides a character video signal which is displayed within the insert to provide the display. In addition, selectable video from the camera being set up is provided; viz, conventional multiplexed video, spatial error video and/or character video is displayed on the monitor as a conventional video picture and/or the display which is superimposed on the picture.

Accordingly, it is an object of the invention to provide an operator with the status and diagnostic condition of a plurality of video cameras at a common monitor location.

It is another object to display the status and diagnostic condition of a camera together with a selected video signal therefrom, during an automatic setup procedure of a multi-camera system.

It is a further object to provide a display system for monitoring the status of a camera in a multi-camera system utilizing data stored in the camera measurement system during an automatic setup procedure.

Still another object is to provide a monitor system which displays video indicative of the existing spatial errors in a camera being set up, to determine the extent of spatial mis-registration of a camera prior to initiating a complete setup procedure.

BRIEF DESCRIPTION OF THE DRAWINGS

FIG. 1 is a block diagram depicting the invention combination.

FIG. 2 is a block diagram depicting the system of FIG. 1 in a multi-camera automatic setup system.

FIGS. 3, 4, 5, 6 are charts depicting the display superimposed on a monitor video picture.

FIG. 7 is a chart of a video picture depicting A-B video with mis-registration.

FIGS. 8A, 8B, 8C are a schematic diagram depicting one implementation of the block diagram of FIG. 1.

DESCRIPTION OF THE PREFERRED EMBODIMENTS

The camera status and diagnostic system 10 of FIG. 1 provides means for displaying the status of a camera during an automatic setup procedure of one or more cameras. Typical of a multi-camera system utilizing automatic setup of one or a given succession of cameras, is the broadcast color camera BCC-20/21 with fully automatic setup unit (ASU), manufactured by Ampex Corporation, Redwood City, Calif. The status and diagnostic system of description herein, provides the continuous display of the setup status for each camera, as well as error data generated by the setup, whereby an operator readily may ascertain the setup progress and/or any misregistration condition in a plurality of cameras, using a single, conveniently located monitor.

To this end, a camera system vertical (V) inhibit signal, related to the camera system vertical blanking signal, is provided on an input 12, and is used to synchronize the status and diagnostic system 10 to the camera system sync. Input line 12 is coupled to a vertical/horizontal (V/H) reset circuit 14, which also receives a one megaHertz (1 MHz) timing signal or system clock on one line of multiple lines 16. The lines 16 include several 1 MHz squarewaves at different phases in increments of, for example, 125 nanoseconds (ns), which are used in the system 10 to time the various latches, counters, etc. The reset circuit 14 supplies vertical (V) reset pulses to a V count logic 18 and to a horizontal (H) count logic 20, via a line 22. The H count logic 20 provides an H rate signal via a line 24 to the V count logic 18. The V/H count logics 18, 20 generate outputs which define the start of an insert time window within the video picture, which window contains the display, as further described below. Accordingly, V count logic 18 supplies a V gate via line 26 to an insert logic circuit 28, and the H count logic 20 provides H address information in the form of 8-bit words via an H address bus 30. The insert logic circuit 28 receives an H gate on a line 34 and supplies an insert gate via a line 32, to initiate the location of the insert.

A command bus 36 is supplied from the camera system ASU microprocessor via a control interface (FIG. 2) and includes data in the form of 8-bit words which define parameters such as the camera number, the color tube, error messages and the status of the camera. The command bus 36 is coupled to a control bus latch/status memory 38 which also receives and returns "handshake" signals in the form of data "ready" and "strobe" pulses on lines 40, 42 respectively. When the ready pulse from the microprocessor goes high, it provides the indication that data is ready and initiates the transfer of the data into the status and diagnostic system 10. The strobe pulse provides a write enable signal to the latch/status memory 38 when it goes low, and an acknowledgement back to the microprocessor that data has been transferred when it goes high.

The control bus latch/status memory 38 provides temporary memory to hold the command bus data whereby the microprocessor is freed to perform other tasks. The camera and tube identification data, the camera status, and the error code data are then supplied from the latch/status memory 38 to a display multiplexer 46 via plural buses 44. The display multiplexer 46 in turn selectively directs the various data to a programmable data read-only memory, herein termed a data ROM 48, via a data line select bus 50, in response to controls on a multiplexer control bus 55 from a control ROM/latch 52. The data ROM 48 is programmed to contain selections of the characters and the various messages which make up the display, which then are selectively addressed to generate the display.

The H address bus 30 is coupled in part to the data ROM 48 via a partial 5-bit H address bus 51, and the full 8-bit H address bus 30 extends to the programmable control ROM/latch 52. The latter circuit generates the H gate on line 34, an "end insert" signal to the V count logic 18 via a line 53, as well as a status read address signal on a bus 54 extending to the control bus latch/status memory 38.

The data ROM 48 is coupled to a character generator 56 via a character code bus 58, wherein the character video from character generator 56 is supplied to a character reverse circuit 57 via a line 62, and thence to a video insert switch means 60 via a line 63. The switch means 60 includes an A-B video switch 64, herein depicted as a separate block, which supplies selected analog video to the switch means 60 via a line 66. The character reverse circuit 57 includes means for selectively generating reverse character video in response to a comparison of character codes from the data ROM 48 via a bus 59, and input select data from the control bus latch/status memory 38 via a bus 61.

A multiplexed video signal from a respective camera in the camera system, is provided via an input line 68 extending to an input A of the A-B video switch 64. Likewise, an electronic test pattern (ETP) video signal is supplied to an input B of the switch 64 via an input line 70, a buffer 76 and a low pass filter 77. Fine registration and course registration status signals are supplied to the video switch 64 via input lines 72, 74 and an OR gate 79. The status signal on lines 72 or 74 is high when the ASU measurement system is performing fine or coarse registration measurements, respectively. Thus, the OR gate 79 provides an A-B gate for determining whether the switch 64 selects multiplexed video, or spatial error (A-B) video. The A-B gate also may be provided by a manual override switch, as shown in FIG. 8B. The ETP signal from buffer 76 also is fed to an output line 78 for camera system use. The video insert switch means 60 supplies the monitor video on a monitor video output 80, which signal provides the status and diagnostic display on a display monitor convenient to an operator, as further depicted in FIG. 2.

A shift register defined herein as phase shifter 82 supplies, via the lines 16, the (1 MHz) system clock signals used to generate the characters for the display, and also to re-latch information in the various components of the system. The clock signals are generated from a camera system (1 MHz) H memory address input on a line 86 and an 8 MHz inverted system clock on a line 88, as further described in FIG. 8.

The strobe pulse on line 42 is further coupled to an auto timer circuit 90 which supplies a logic control auto timer signal via a line 92 to the insert logic circuit 28, to automatically disable the status and diagnostic system 10 after a given period of time of non-use, for example, 5 minutes. The timer circuit 90 can be manually defeated via an override switch, as shown in FIG. 8C.

FIG. 2 depicts in simplified block diagram a multi-camera system having a fully automatic setup capability, in which the status and diagnostic system 10 described herein may be utilized. In FIG. 2, an automatic setup unit (ASU) 98 supplies the required measurements, commands, etc., required to fully process the cameras during the course of an automatic setup procedure. The ASU includes a microprocessor/memory means 100 which initiates the various commands to control the exchange of data, as well as to complete the correction functions of the camera system. The means 100 includes enough memory to store various software programs, to store measure and correction buffer data for a plurality of cameras (indicated herein at 102) and for the serial and parallel hardware which handle the various input/output circuits. The microprocessor/memory means 100 interfaces with a video measurement means 104 via a bus 105 and a control interface board 106, and sends the necessary commands to initiate the various measurement functions and the camera selection, etc., necessary for the setup procedure. The control interface 106 includes interface to several ASU functions. The function of interest herein is provided via the command bus 36 to the status and diagnostic system 10, which provides the status display on a video monitor 108 via the monitor video output line 80 of FIG. 1. The microprocessor/memory means 100 further receives inputs from the video measurement means 104 in the form of measurement data, over a data bus 110 from a data interface board 112. Such measurement data is utilized in part as the error and function information employed by the status and diagnostic system 10 to form the display.

The microprocessor/memory means 100 further is coupled to a data routing means 114 via a bus 115, and through control of the routing switches therein, channels the serial data path of one of the selected plurality of cameras 102 to the buses 105, 36. An operator control panel (OCP) 118 is inserted upstream of the cameras 102 and provides means whereby an operator can enter commands to the automatic setup unit. The numbers of the selected cameras are entered from the master setup panel (MSP) 116 into the microprocessor/memory means 100 and are utilized in the measurement system as well as in the status and diagnostic system 10.

Thus, system 10 is utilized in a microprocessor controlled environment, with video signals supplied from a selected camera of a plurality of cameras 102, wherein error measurement data pertinent to the camera are likewise provided via the microprocessor/memory means 100 during the course of an automatic setup procedure. The status and diagnostic condition of the camera being processed is continuously displayed on the monitor 108 as determined by the data on command bus 36 from the microprocessor/memory means 100.

The associated command bus assignments employed in the status and diagnostic system of description herein, are depicted accordingly in Table 1, by way of example only. Obviously many other functions, symbols, binary code words, messages, etc., are contemplated by the invention combination.

TABLE 1

COMMAND BUS ASSIGNMENTS

| Bit | 7 | 6 | 5 | 4 | 3 | 2 | 1 | 0 | |
|---|---|---|---|---|---|---|---|---|---|
| Symbol | 0 | 0 | $M_r$ | $r$ | $I_3$ | $I_2$ | $I_1$ | $I_0$ | Byte 1 |
| | Cmd | Byte | Master Reset | Minor Reset | | Input Select | | | |
| | 0 | 1 | 0 | 0 | $F_3$ | $F_2$ | $F_1$ | $F_0$ | Byte 2 |
| | | | N/A | N/A | | Function Code | | | |
| | 1 | 0 | $S_3$ | $S_2$ | $S_1$ | $S_0$ | $T_1$ | $T_0$ | Byte 3 |
| | | | Status | | | | Tube Color | | |
| 0000 = 0 | | 0101 = 5 | | 1010 = Blank | | | 00 = Blank | | |
| 0001 = 1 | | 0110 = 6 | | 1011 = S | | | 01 = Green | | |
| 0010 = 2 | | 0111 = 7 | | 1100 = D | | | 10 = Red | | |
| 0011 = 3 | | 1000 = 8 | | 1101 = ? | | | 11 = Blue | | |
| 0100 = 4 | | 1001 = 9 | | 1110 = E | | | | | |
| | | | | 1111 = Spare | | | | | |
| | 1 | 1 | $E_5$ | $E_4$ | $E_3$ | $E_2$ | $E_1$ | $E_0$ | Byte 4 |
| | | | | | Error Code | | | | |
| Binary Word | | | Hex | | Message | | | | |

TABLE 1-continued

COMMAND BUS ASSIGNMENTS

| Binary Word | Hex | Message |
|---|---|---|
| 11000000 | C0 | ---BLACK--- |
| 00001 | C1 | READY |
| 00010 | C2 | TEST BUFFER INVALID |
| 00011 | C3 | |
| 00100 | C4 | CHECK DATA PATH |
| 00101 | C5 | CHECK VIDEO PATH |
| 00110 | C6 | ON AIR |
| 00111 | C7 | VIDEO LEVEL INVALID |
| 01000 | C8 | CAM REACTION INVALID |
| 01001 | C9 | BLACK LEVEL RANGE |
| 01010 | CA | WHITE LEVEL RANGE |
| 01011 | CB | H-CENTER ADJ. |
| 01100 | CC | V - CENTER ADJ. |
| 01101 | CD | H - SIZE ADJ. |
| 01110 | CE | V - SIZE ADJ. |
| 01111 | CF | ROTATION ADJ. |
| 10000 | D0 | REGISTR SEC RANGE |
| 10001 | D1 | BEAM FOCUS VALUE |
| 10010 | D2 | BEAM LEVEL RANGE |
| 10011 | D3 | X - ALIGN OUT OF RANGE |
| 10100 | D4 | Y - ALIGN OUT OF RANGE |
| 10101 | D5 | BIAS LIGHT LEVEL |
| 10110 | D6 | BIAS COMPENSATION |
| 10111 | D7 | BLACK SHADING RANGE |
| 11000 | D8 | WHITE SHADING RANGE |
| 11001 | D9 | FLARE RANGE |
| 11010 | DA | GAMMA RANGE |
| 11011 | DB | DIASCOPE GREY LEVEL |
| 11100 | DC | |
| 11101 | DD | |
| 11110 | DE | |
| 11111 | DF | |

As shown in the Table, the microprocessor/memory means 100 supplies four instruction code words (command bytes 1, 2, 3 and 4) for various uses in the ASU measurement system, as well as in the status and diagnostic system 10. The four least significant bits (LSB) of the first byte define the input select command of the system 10. The second byte is not used by the system 10. The third and fourth bytes are used by the system 10, and are termed the status and error code command bytes, respectively. By way of example only, the status command byte provides the characters "S", "D," "?" and "E" which represent the camera status of "selected", "done", marginal fault and setup ending error, respectively. The status command byte also provides numbers 0 through 9 which indicate the extent of progress of the setup procedure for the selected camera. Thus, a "0" character in the display indicates that setup has just started, "4" indicates setup is half done, and a "9" indicates setup is almost done.

The two most significant bits (MSB) of the bytes determine the purpose of each byte. Accordingly, by manipulating the two MSB of the bytes 1, 2, 3, 4, the microprocessor/memory means 100 determines the desired measurement function, the camera to be set up, and further enables the status and monitor system 10 to display the resulting camera status. More particularly, the first byte represents, inter alia, the input camera number which is selected for setup; the second byte determines coarse registration and is not utilized in the system 10 described herein; the third byte represents the status and tube information for use in the status system; and the fourth byte represents the error code and provides six bits of information to determine up to 64 unique messages which, in turn, may provide a full 31 characters within the display. As further discribed in FIGS. 3, 4, 5 and 6, the display is formed of three "lines" of text, herein termed three "rows" of text or characters. By way of example only, each character herein is formed of 16 horizontal television lines.

Table 1 further contains a list of the (32) error code binary words which provide the command messages corresponding to the various functions, problems, etc., experienced by a camera during the setup procedure, and which comprises the messages displayed in the display in the third row of characters. The various application of the command bus assignments, the error codes, etc., in the status and diagnostic system 10, are further described relative to the schematic of FIG. 8 below.

FIGS. 3, 4, 5 and 6 illustrate by way of example only, the display format employed herein. Obviously, many other formats, insert time window arrangements, types of information, etc., are contemplated within the invention combination. As shown in FIG. 3, the display extends approximately three-fourths of the horizontal width of the active video picture, and is centered in the bottom half of the picture so as not to obstruct the more critical center and corner portions thereof. Three rows of characters, or text, are shown, wherein each row may provide 31 white characters (corresponding to white level video) on a black background (corresponding to black level video). The top or first row includes the word "camera" and the camera numbers 1 through 8, as determined by the first or input select command byte of the Table 1. The camera being set up and thus whose status is being shown, is identified as shown in FIGS. 4 and 5 by reversing the character video thereof to provide a black character on a white background. In FIG. 3, setup has just been initiated, the cameras to be setup have not yet been selected and thus no camera number is shown in reverse character video on the first or input select row, and no status data is shown in the second or status row. The third or error code row displays the message "ready" corresponding to the 6-bit binary word "one" of Table 1. This indicates to an operator that the automatic measurement system 98 of FIG. 2 is ready to begin the setup procedure.

In FIG. 4, the character "S" in the status text row indicates that cameras 2, 3, 4 and 6 have been selected for setup, and the reverse character video on camera 6, input select row, indicates camera 6 is presently being processed.

In FIG. 5, camera 4 is being processed and the questionmark on the status row indicates to the operator that there is a marginal problem being experienced by the camera. The problem area is identified in the error code row; i.e., the "rotation adjust" function of the green tube of camera 4 has not been fully completed. The character "?" indicates that the camera is operable as set up, but that the operator should keep in mind that the rotational adjustment of the green tube is at fault.

In the display of FIG. 6, the character "D" indicates that setup is successfully done on cameras 2, 3 and 6, and that the green tube of camera 4 still has a fault regarding rotation. If the fault were corrected, the "?" is replaced by a "D," the message on error code row is removed, and setup on cameras 2, 3, 4 and 6 is successfully completed.

In FIGS. 3–6, multiplexed camera video is simultaneously being shown as an active video picture upon which the display insert is superimposed. As previously mentioned, the camera being set up may supply conventional multiplexed video, or A-B video formed by displaying a subtracted video signal, i.e., the ETP signal subtracted from the multiplexed video which, in this system, is video the camera generates when scanning the optical test pattern. The videos are subtracted in the analog domain via action of the A-B switch 64 and the A-B signal is indicative of any mis-timing, and thus mis-registration, of a camera tube when scanning the optical test pattern. The A-B gate is supplied via the ASU measurement system 98 of FIG. 2, which is described in copending U.S. application Ser. No. 139,604 to K. H. Griesshaber, cross-referenced above, now issued as U.S. Pat. No. 4,326,219.

FIG. 7 shows a portion of a video picture depicting an A-B spatial error signal in which a mis-registration or horizontal offset, of 40 ns has been introduced. Such a rather small mis-registration between the scanned optical test pattern and the ETP is readily seen as alternate white and black vertical bars located at the black/white, white/black transitions of the checkers which form the test pattern. Thus an operator can quickly and accurately visually determine whether a spatial error exists in the cameras being setup prior to actually performing a full spatial measurement and correction via the ASU system 98.

FIGS. 8A, 8B and 8C depict an implementation of the block diagram of FIG. 1, wherein like components are similarly numbered. In FIG. 8A, V inhibit is provided to the V/H reset circuit 14 via the input line 12, and is a pulse which occurs approximately two horizontal lines earlier than system V blanking. V inhibit provides not only V sync for the system 10 but herein also is a source of system 10 horizontal timing. The reset circuit 14 comprises a pair of D-type flip-flops 119 which are clocked by the 1 MHz clock from port E of the phase shifter 82 via one of the lines 16. The V/H reset circuit 14 re-clocks V inhibit to provide a V reset pulse and an inverted V reset pulse, which are short (1 us) reset pulses which pre-load vertical counters 120a, 120b and horizontal counters 122a, 122b, 122c and 122d in the V count and H count logics 18, 20 respectively.

The count logics 18, 20 divide down the 1 MHz system clock supplied on lines 16, whereby the H count logic 20 generates the H addresses for the characters in each of the three rows of text forming the display. The V count logic 18 generates vertical line numbers in response to the 1 MHz clock and the H rate signal on line 24 from H counter 122b. The counters are re-locked to the system clock every vertical field by the pre-setting action of the V reset pulses from the V/H reset circuit 14. V count logic 18 produces the V gate signal on line 26, where pre-loading the V counters 120a, b, selectively locates the start of the insert window within the video picture, i.e., places the display in the lower region of the video picture where it least obstructs the video information presented on the monitor. Presetting of the V count logic 18 for the NTSC 525 line color television standard, or for the PAL 625 line standard, is selectable via a pair of jumpers 124, 126 respectively. The V count logic 18 also provides a start first character logic signal via a flip-flop 128 and a line 130 to the H count logic 20 (counter 122c) and to the character generator 56.

The insert window is ended by an insert end pulse on line 53 from the control ROM/latch 52. The latter is programed to generate the pulse when a sufficient number of horizontal lines have been counted to provide the three rows of display text with sufficient spacing around the rows of characters to be visually pleasing. The insert end pulse resets an output flip-flop 132 in the V count logic 18 to end the insert while still allowing the V counters 120a, b to continue counting.

The H count logic 20 provides the 8-bit H address words to the control ROM/latch 52 via the bus 30, as well as 5-bit H address words on bus 51 to the data ROM 48, in response to the 1 MHz clock from port D of the phase shifter 82. The H counter 122a provides the first four LSB of the character column addresses; the H counter 122b provides the two MSB of the character column addresses; the H counter 122c supplies the spacing between the character rows; and the H counter 122d provides the text line addresses.

The insert logic circuit 28 (FIG. 8C) comprises an AND gate which receives the V gate and the H gate, and initiates the vertical and horizontal start of the insert in the video picture when both gates go high, via a corresponding insert gate signal on the line 32 extending to the video insert switch 60.

Thus, the components 14, 18, 20 and 28 define means for generating an insert time window in a selected area of the video picture generated by a television camera during the setup procedure. The display data for filling the insert is then derived via various other components of the system 10, as described below.

To this end, the major source of information introduced from the ASU of FIG. 2, comprises the four command bytes shown in Table 1 and supplied via the command bus 36, FIG. 8B. Upon occurrence of the data ready pulse on line 40, the two MSB of the command bus are decoded to one of four possible combinations in a decoder 134. The latter steers the ready pulse to one of the four outputs wherein three of the outputs therefrom are used to clock three latches 136, 138 and 140 in the control latch/status memory 38. Thus, the first set of latches 136–140 allows the system 10 to latch incoming data on the command bus 36 within a few microseconds, whereby the microprocessor memory means 100 can be released to perform other tasks, such as changing control to the next camera. A fourth latch 142 comprises a second level of delay, i.e., a delayed latch of data from the first set of latches, and, in particular, latches the three LSB from the latch 140 corresponding to the input select command, i.e., camera number (byte 1), as well as the two LSB from the latch 138 corresponding to the tube command (byte 3). A status memory 144 also provides a delayed latch of status data from the latch 138. The status byte is latched into the status memory 144 in response to the three LSB of the input select byte, and the strobe pulse on line 42 which is fed to the write enable input of the memory 144. The camera number data must be latched into the input select latch 140 before the status data can be written into the status memory 144.

Thus, the latch 140 latches the input select command byte of Table 1 from the command bus 36, when clocked by the y0 output of decoder 134; latch 138 latches the status and tube data corresponding to the second command byte of Table 1 when clocked by y2 output; and latch 136 latches the error code data corresponding to the fourth command byte of Table 1 in response to the y3 output of decoder 134.

The tube and input select data is then latched into the second level latch 142, while the status and input select data is further latched into the status memory 144 as previously mentioned. The latched data is then fed to the display multiplexer 46 via the multiple buses 44, to determine the data ROM selections in response to control by the control ROM/latch 52.

The latch 142 provides the data that is displayed as the suffix of the error code message on the third row of display text, i.e., the camera number and tube color. However, in situations where a suffix message is not desired, for example, in FIGS. 3 or 4, or where the ASU has an internal fault, etc., the display of the suffix is defeated by the binary number of the associated error code message, whereby the display multiplexer 46 calls out the corresponding address in the data ROM 48 to prevent the latter from shifting out of the lower half of the memory.

The status memory 144 is, in effect, a register file memory which has independent write and read circuits and functions, since the read-out process is slaved to the incoming video, and the write process is timed to the microprocessor system.

In FIG. 8A, the control ROM/latch 52 includes a 1k×8 programable E-PROM 146 followed by a latch 148, and functions as a programed logic array where specific H addresses, or range of addresses, are decoded to define the display. Thus the E-PROM 146 is programed to include a number of character blocks, the three rows of display text and the overall spacing and extent of the display. The addresses are supplied via the H count logic 20, whereby the control ROM/latch 52 switches the display multiplexer 46 via the multiplexer control logic on the 2-bit bus 55, to provide selected characters and error code messages contained in the data ROM 48. The latch 148 also provides the 3-bit status read addresses via the bus 54 to the read enable inputs of the status memory 144.

The data ROM 48 is programmed with selections of the desired characters, and a plurality of messages of up to 31 characters in length such as the error code messages in Table 1 above. In practice, 21 characters are used. The selections are called up by the data line selections from the display multiplexer 46 on the bus 50, and include whether status information, error code information, or the suffix of the error code corresponding to the camera and tube numbers, etc., are to be displayed. The data ROM 48 character positions are addressed via the H count logic 20 to increment the data ROM 48 horizontally on each text line via the H address bus 30 from the counter. The H count logic 20 cycles the data ROM 48 through 31 possible character columns. The data ROM is switched internally between the camera and tube suffix, and the last 10 characters of the stored error code message, via a high frequency clock generated via the error code on the bus 44, a gate array 150 (FIG. 8B) and a line 149. The output of the data ROM 48 calls up the specific characters in the character generator 56. Thus, the data ROM 48 and the character generator 56 provide in effect a conventional character generator. However, in the system 10, the selection of the proper data to input to the character generator 56 is a function of the display multiplexer 46 as controlled in turn by the control ROM/latch 52.

The character generator is supplied with a line input clocked from the H line rate signal via a line 152. A dot clock input is coupled to a clock from the input 88 (FIG. 8B) via a line 154 and generates the character dots where determined via the data ROM 48 output. The load input of the character generator 56 is coupled to the G and B ports of the phase shifter 82 via the lines 16 and a NAND gate array 156, where the latter further includes an input from the start first character line 130 from the flip-flop 128 (FIG. 8A).

Referring to FIGS. 8A, 8C, the character generator 56 is coupled to the video insert switch 60 via the character reverse circuit 57. The latter circuit detects the number of the camera being processed and reverses the character video from the generator 56 to highlight the camera number in the first display row so it may be readily discernable from the other numbers of the row. That is, the character video is reversed during the horizontal video lines corresponding to the character height plus the spacing above and below the first row of text. This provides a black character on a white background as shown in FIGS. 4, 5.

To this end, character reverse circuit 57 includes a comparator 158 which has inputs A coupled to receive the input select command byte via the bus 61, and inputs B coupled via the bus 59 to receive the four LSB of the character code signal from the data ROM 48. When the A and B binary inputs are equal, as in the case when they receive the number of the camera being processed, the comparator supplies a change of state on its A=B output to a D-type flip-flop 160, which supplies the state change as a character reverse signal to one input of an exclusive OR 162. The other input is coupled to the character video line 62. The exclusive OR 162 is a noninverting buffer as long as the character reverse state is low, but becomes an inverter when the character reverse goes high, as when digital A equals digital B. The regular, or the reversed, character video is fed to the video insert switch via the line 63.

As shown in detail in FIG. 8C, the video insert switch 60 and the A-B video switch 64 actually comprise an integral switch means with three possible modes of output; i.e., multiplexed video, A-B video, and/or character video. Thus, the combination switch means provides a three-way switch controlled by logic determined by the desired mode of output, and includes differential amplifiers 164, 166, 168 with associated constant current sources 170, 172, 174 respectively. One side of differential amplifier 164 receives the multiplexed video on line 68. The signal is halved via a voltage divider 176 and is fed to one side of the A-B differential amplifier 166. The second side of A-B amplifier 166 receives the ETP video via the line 70, the buffer 76, the low pass filter 77 and a gray offset circuit 178. The latter configures the A-B differential amplifier 166 to become a subtracting amplifier. Thus if the video on line 68 equals the video on line 70 (as when in the A-B video mode and there is no spatial mis-registration) the monitor video output signal on output line 80 will provide a totally gray video picture on the monitor 108.

One side of the differential amplifier 168 receives the character video via line 63. The outputs of the differential amplifiers 164, 166, 168 supply the monitor video output on line 80 via a line driver circuit 180.

The emitters of the current sources 170, 172, 174 are tied together. The base of current source 174 is coupled to the insert gate via the line 32, and the bases of current sources 170, 172 are coupled to line 32 via respective NAND gate arrays 182. The latter in turn are also coupled to an inverted A-B gate and to a valid blanking signal on an input line 184 (FIG. 8B) via a NAND gate 186. The bases of the current sources are coupled to resistive voltage dividers whereby only one source is on at one time since the emitters thereof are tied together.

The inverted A-B gate is derived on a line 187 from the fine or coarse status signals on input lines 72, 74 via a manual dip switch/gate means 188, which includes the OR gate 79 of FIG. 1. The means 188 provides three dip switches for manually overriding the fine or coarse status signals and to select A-B on or off. When in the manual position, the respective dip switches connect the switch/gate means 188 to +5 volts, i.e., a high state, to provide fine, coarse or both signals manually. The valid blanking signal on line 184 is related to composite video blanking and inhibits the A-B selection during the inactive region of the video picture.

The A-B video switch 64 is in essence an analog subtractor which performs an analog subtraction of the ETP signal on input 70 from the multiplexed input video on line 68, in response to the A-B gate. If there is no spatial displacement error or mis-registration between the signals, the two incoming video signals will correspond over the video picture, whereby the resulting background video will be an even gray field. If there are mis-registration or timing errors, there will be noticeable edges on the transistions, wherein the difference of black or white depends upon the relative delay. This effect was previously discussed and depicted in the FIG. 7, wherein a horizontal offset of 40 ns was introduced to illustrate the effect.

The auto timer circuit 90 (FIG. 8B) includes a counter 190 whose count is reset by the strobe pulse on input line 42 and which is clocked via the V inhibit signal on input line 12. The output thereof is coupled via a D-type flip-flop 192 to the insert logic circuit 28 via the line 92 and a pair of switches 194, 196. Thus, the automatic shutoff feature can be manually defeated by opening the switch 194. Switch 196 defeats the insert window in the down position to allow viewing of the entire video picture.

What is claimed is:

1. System for monitoring via a selected display the status as well as malfunctions of a video camera during a setup mode, comprising:
   a monitor for providing a video picture corresponding to the output of the video camera during the setup mode;
   insert means operatively coupled to the monitor for generating an insert window anywhere within the video picture while providing horizontal addresses indicative of the display;
   means for supplying data indicative of the operation of the camera and of its setup status;
   character generating means for storing character data descriptive of the operation of the camera and of its setup status; and
   display control means coupled to the means for supplying data and to the character generating means for selectively addressing the character data to generate a character video signal corresponding to the display of the camera operation and status.

2. The system of claim 1 wherein the character generating means include;
   data memory means containing addressable selections of character and error code message data descriptive of the camera operation and status; and
   a character generator coupled to the data memory means for supplying display characters corresponding to the selections addressed in the data memory means in response to the display control means.

3. The system of claim 2 wherein the display control means include;
   control memory means containing display format data addressable by the insert means; and multiplexer means coupled to the means for supplying data for selectively determining the data memory means selections in response to the control memory means.

4. The system of claim 2 wherein the insert means include;
a counter;
a source of system vertical sync;
vertical count logic means responsive to the system vertical sync for generating a vertical gate signal indicative of the insert window vertical start; and
horizontal count logic means responsive to the system vertical sync for generating horizontal addresses indicative of the horizontal locations of the character data.

5. The system of claim 3 wherein the means for supplying data include;
a source of data ready pulses; and
latch means for latching the data indicative of the camera operation and of its setup status in response to the data ready pulses;
wherein the multiplexer means receives the latched data in response to the control memory means.

6. The system of claim 2 including;
multiple video cameras having respective camera video signals; and
switch means for receiving the multiple camera video signals and for supplying one of the video signals to the monitor in response to the insert means.

7. THe system of claim 6 wherein the switch means include;
a difference switch coupled to receive the camera video signals; and
a video switch integral with the difference switch and coupled to the character generator for supplying the character video signal to the monitor in response to the insert means.

8. System for monitoring via a display the status of a plurality of cameras during a setup mode, comprising;
means for successively selecting given cameras of the plurality, each with a respective video output signal;
monitor means for forming video pictures of the selected camera's output signal;
means responsive to the means for selecting, for supplying data corresponding to the identification and status of each of the cameras; and
means coupled to the means for supplying for continuously superimposing on the video pictures successive displays of information which correspond to the identity and status of each camera;
said means for superimposing further including;
insert means for generating an insert window in the video picture;
control memory means coupled to the insert means for containing addressable display format data;
character generating means coupled to the control memory means and to the insert means for generating a character video signal corresonding to the display information provided by the means for supplying for each camera as controlled by the control memory means; and
switch means coupled to the character generating means for inserting the respective character video signal of the selected camera within the insert window in response to the insert means.

9. The system of claim 2 or 8 further including;

character reverse means coupled to the character generating means for reversing the character video signal in response to the selected camera data from the means for supplying.

10. The system of claim 8 wherein the means for supplying include command latch means for latching the camera data in response the means for successively selecting the camera.

11. The system of claim 10 further including;
multiplexer means coupled to the command latch means for multiplexing the latched camera data to the character generating means in response to the control memory means.

12. The system of claim 8 wherein the character generating means include;
data memory means coupled to the insert means for containing addressable selections of characters and error code messages descriptive of the camera data; and
a character generator responsive to the data memory means for generating the character video signal corresponding to the display information.

13. The system of claim 12 wherein;
the insert means generates horizontal addresses indicative of the display format configuration superimposed on the video picture; and
the data memory means selections are addressed via the horizontal addresses in response to the control memory means to generate the character video signal.

14. The system of claim 6 or 8 wherein;
the camera supplies a multiplexed video signal and an electronic test pattern video signal;
the switch means includes means for providing a difference video signal equal to the difference between the electronic test pattern and the multiplexed video signals; and
the switch means supplies the multiplexed video or the difference video signal to the monitor.

15. The system of claim 8 wherein the insert means include;
a source of system vertical sync;
horizontal/vertical counter means responsive to the system vertical sync for generating horizontal addresses indicative of the insert window character format configuration; and
insert logic means coupled to the horizontal/vertical counter means for initiating the start of the insert window.

16. The system of claim 15 wherein the control memory means supplies a horizontal gate signal to the insert logic means to determine the insert start, and an end insert signal to the horizontal/vertical counter means to end the insert, in response to the horizontal addresses.

17. A system forgenerating a display of selected format indicative of the status of a camera and associated image tube during a multi-camera setup, comprising;
camera microprocessor/memory means for controlling the camera setup and for supplying camera status data regarding camera, image tube and setup for each;
a monitor for generating a video picture;
latch means coupled to the camera for receiving and latching the respective camera status data in response to the microprocessor/memory means;
insert means for generating an insert window in the video picture and horizontal addresses indicative of the display format;

control memory means coupled to the insert means for containing addressable display format data;

character generating means coupled to the control memory means and the insert means for containing selections of characters and error code messages and for supplying a character video signal to the monitor in response to the horizontal addresses as controlled by the control memory means; and switch means coupled to the character generating means and to the cameras for selectively supplying the character video signals and camera video signals to the monitor in response to the insert means.

18. The system of claim 17 further including;

character reverse means coupled to the character generating means for reversing a given portion of the character video signal indicative of the number of the camera being setup.

19. The system of claim 17 wherein;

the display format includes multiple rows of text with each row formed of a selected plurality of horizontal lines;

the latch means latches data which identifies the camera, the image tube thereof, camera status and error code messages; and the character video signal from the character generating means is displayed in selected rows of the display in response to the horizontal addresses as controlled by the control memory means.

20. Method for monitoring the status of a plurality of cameras during a setup mode, comprising;

selecting a given camera of the plurality each with a respective video output signal;

forming video pictures of the selected camera's output signal;

supplying data corresponding to the identification and status of each of the cameras;

storing the display information in an addressable display format;

generating a character video signal corresponding to the display information in response to addressing the display format;

generating an insert window in the video picture; and inserting within the insert window in the video pictures successive displays of continuous information corresponding to the respective character video signals indicative of the identity and status of each camera.

21. The method of claim 20 further including;

reversing the character video signal identifying a camera number in response to detecting the camera being setup.

22. The method of claim 20 wherein the step of supplying data includes latching the camera data in a temporary storage.

23. The method of claim 20 wherein the step of supplying data includes the steps of;

latching data identifying the camera;

latching data identifying the extent of completion of the setup process for the respective camera; and latching data identifying any malfunctions experienced by the respective camera.

24. The method of claim 20 further including;

switching between the character video signal and the video output signal of the respective camera during the course of a video picture to superimpose the display in the video picture.

* * * * *